US 8,678,186 B2

(12) United States Patent
Fabian

(10) Patent No.: US 8,678,186 B2
(45) Date of Patent: Mar. 25, 2014

(54) WIRE PAYOFF BRUSH AND CONTAINER CONTAINING A WIRE PAYOFF BRUSH

(75) Inventor: Gabor Fabian, Brampton (CA)

(73) Assignee: Lincoln Global, Inc., City of Industry, CA (US)

( * ) Notice: Subject to any disclaimer, the term of this patent is extended or adjusted under 35 U.S.C. 154(b) by 1258 days.

(21) Appl. No.: 11/558,183

(22) Filed: Nov. 9, 2006

(65) Prior Publication Data

US 2008/0110779 A1    May 15, 2008

(51) Int. Cl.
*B65H 49/06* (2006.01)

(52) U.S. Cl.
USPC ...................................................... 206/409

(58) Field of Classification Search
USPC ............ 206/409, 398, 389, 408, 388, 413; 15/207.2, 179; 242/365.4, 147 R, 242/362.2, 224, 128, 129, 615.4, 615.3, 242/615, 588.6, 588.3, 566, 171, 170
See application file for complete search history.

(56) References Cited

U.S. PATENT DOCUMENTS

| | | | | |
|---|---|---|---|---|
| 2,479,826 A * | 8/1949 | Frick et al. | ............ | 242/128 |
| 2,608,034 A * | 8/1952 | Fromson | ............ | 451/468 |
| 2,838,922 A * | 6/1958 | Gift | ............ | 66/125 R |
| 3,237,233 A * | 3/1966 | Adams | ............ | 15/182 |
| 3,298,631 A * | 1/1967 | Richardson, Jr. | ............ | 242/129 |
| 3,343,195 A * | 9/1967 | Menges | ............ | 15/179 |
| 3,353,200 A * | 11/1967 | Charvat | ............ | 15/179 |
| 3,618,873 A * | 11/1971 | Fons et al. | ............ | 242/128 |
| 3,758,046 A * | 9/1973 | Jordan | ............ | 242/147 R |
| 3,811,639 A * | 5/1974 | Jordan | ............ | 242/129.8 |
| 3,863,861 A * | 2/1975 | Bellasio | ............ | 242/128 |
| 3,870,242 A * | 3/1975 | Schussel | ............ | 242/365.4 |
| 3,969,090 A * | 7/1976 | Sasena et al. | ............ | 451/532 |
| 3,990,652 A * | 11/1976 | Brown | ............ | 242/129.8 |
| 3,995,786 A * | 12/1976 | Deniega | ............ | 242/365.4 |
| 4,017,037 A * | 4/1977 | Kovaleski | ............ | 242/129.8 |
| 4,106,712 A * | 8/1978 | Savio et al. | ............ | 242/419.7 |
| 4,153,214 A * | 5/1979 | Savio et al. | ............ | 242/365.4 |
| 4,171,783 A * | 10/1979 | Waltemath | ............ | 242/128 |
| 4,222,535 A * | 9/1980 | Hosbein | ............ | 242/128 |
| 4,334,653 A * | 6/1982 | Whellams | ............ | 242/129.8 |
| 4,434,609 A * | 3/1984 | Schacht | ............ | 57/58.86 |
| 4,869,367 A * | 9/1989 | Kawasaki et al. | ............ | 206/409 |
| 5,277,314 A * | 1/1994 | Cooper et al. | ............ | 206/398 |
| 5,310,127 A * | 5/1994 | Deiuri | ............ | 242/365.4 |
| 5,497,607 A * | 3/1996 | Branson | ............ | 57/58.52 |
| 5,588,172 A * | 12/1996 | Biocca | ............ | 15/179 |
| 5,608,941 A * | 3/1997 | Kleinfeld | ............ | 15/179 |
| 5,758,834 A * | 6/1998 | Dragoo et al. | ............ | 242/128 |
| 5,806,780 A * | 9/1998 | Schneider et al. | ............ | 242/419 |
| 5,810,283 A * | 9/1998 | Shea | ............ | 242/559.1 |

(Continued)

OTHER PUBLICATIONS

Counterpart Chinese Patent Application No. 200710089773.1; Third Office Action dated Jul. 7, 2010 with English Translation; pp. 1-17.

(Continued)

*Primary Examiner* — Steven A. Reynolds
*Assistant Examiner* — King M Chu
(74) *Attorney, Agent, or Firm* — Perkins Coie LLP

(57) ABSTRACT

An invention is provided which employs a payoff brush having a ring structure with an inner diameter from which bristles/brush extend. The bristles/brush extend from the inner diameter of the ring structure to contact a wire being paid off from a wire coil so as to ensure smooth payoff of the wire.

23 Claims, 2 Drawing Sheets

(56) References Cited

U.S. PATENT DOCUMENTS

| | | | |
|---|---|---|---|
| 6,016,911 A * | 1/2000 | Chen | 206/395 |
| 6,276,623 B1 * | 8/2001 | Williams | 242/171 |
| 6,409,116 B1 * | 6/2002 | Brown | 242/419.1 |
| 6,547,176 B1 * | 4/2003 | Blain et al. | 242/423.1 |
| 6,715,608 B1 * | 4/2004 | Moore | 206/397 |
| 6,745,899 B1 * | 6/2004 | Barton | 206/409 |
| 6,749,139 B2 * | 6/2004 | Speck | 242/128 |
| 7,004,318 B2 * | 2/2006 | Barton | 206/409 |
| 7,100,863 B2 * | 9/2006 | Hsu et al. | 242/566 |
| 7,121,501 B1 * | 10/2006 | Lea | 242/608.2 |
| 7,191,968 B2 * | 3/2007 | Kuper | 242/171 |
| 7,222,734 B2 * | 5/2007 | Barton | 206/389 |
| 7,367,452 B1 * | 5/2008 | Hsu | 206/409 |
| 2003/0230660 A1 * | 12/2003 | Vernam | 242/271 |
| 2004/0007487 A1 * | 1/2004 | Cantu-Gonzalez | 206/397 |
| 2004/0026284 A1 * | 2/2004 | Cote | 206/397 |
| 2004/0173703 A1 * | 9/2004 | Barton | 242/171 |
| 2005/0224381 A1 * | 10/2005 | Bae et al. | 206/409 |
| 2007/0045141 A1 * | 3/2007 | Gelmetti | 206/409 |
| 2007/0051649 A1 * | 3/2007 | Carroscia | 206/409 |

OTHER PUBLICATIONS

Counterpart Canadian Patent Application 2,580,908; Notice of Allowance dated Aug. 9, 2010; pp. 1-2.

* cited by examiner

WIRE PAYOFF BRUSH AND CONTAINER CONTAINING A WIRE PAYOFF BRUSH

FIELD OF THE INVENTION

The present invention is directed to a wire payoff brush, more specifically to a wire payoff brush used with wire stacks employed in welding operations, and other similar applications.

BACKGROUND OF THE INVENTION

In some welding operations, such as MIG welding, a large wire stack is employed to provide a continuous feed of welding wire (electrode) to the welding gun. In these applications, the welding wire is often stored in a large coil configuration, in which the coil of wire is placed in a box or a container having a core section around which the wire is coiled. The wire is typically paid out through the top of the box, which may or may not have a cap on the box.

In such a configuration, wire payout problems can often occur, for example tangling. Specifically, as the wire is paid out through the top of the box, the upper coils of the wire may become loose, thus causing more than one coil to be pulled, resulting in tangling. When the wire tangles it significantly interferes with the wire payout and thus the welding operation.

A prior attempt to address this problem uses a ring placed on top of the wire coil which provides some weight on top of the coil. This provides some measure to prevent entanglement. In this configuration, as the wire is paid out and the coil height is reduced, the ring travels down with the top of the wire coil. However, this configuration is insufficient to avoid many entanglements, and as the wire is drawn past the ring, the surface of the wire can be damaged, which may affect the payout operation or the weld.

Therefore, there is a need for a configuration which is capable of reducing entanglements even more, without adding to the cost or complexity of wire coil containers, or to the risk of damaging the wire surface during payoff.

SUMMARY OF THE INVENTION

The present invention is directed to solve the above problems by providing a low cost and reliable system to allow for low friction and consistent wire payout during a wire feed operation, in wire coil containers of various sizes having wire coils of varying sizes and diameters, and materials.

To accomplish this, an embodiment of the present invention employs a wire payoff brush in a ring configuration, which is placed at or near the top of wire coil container. The wire payoff ring includes a bristle structure extending from an inner diameter of the ring. As the wire is paid out from the coil, the wire is drawn along the bristles. In an embodiment of the invention, the wire payoff ring is fixed at or near the top of the wire coil container.

Various embodiments of the present invention will be discussed in more detail below.

BRIEF DESCRIPTION OF THE DRAWINGS

The advantages, nature and various additional features of the invention will appear more fully upon consideration of the illustrative embodiments of the invention, which are schematically set forth in the figures, in which.

DETAILED DESCRIPTION OF EXEMPLARY EMBODIMENTS

The present invention relates to a wire payoff ring employed in a wire coil container, such as those employed in welding operations, to allow for low and consistent feed force during wire payout.

Figure 1:
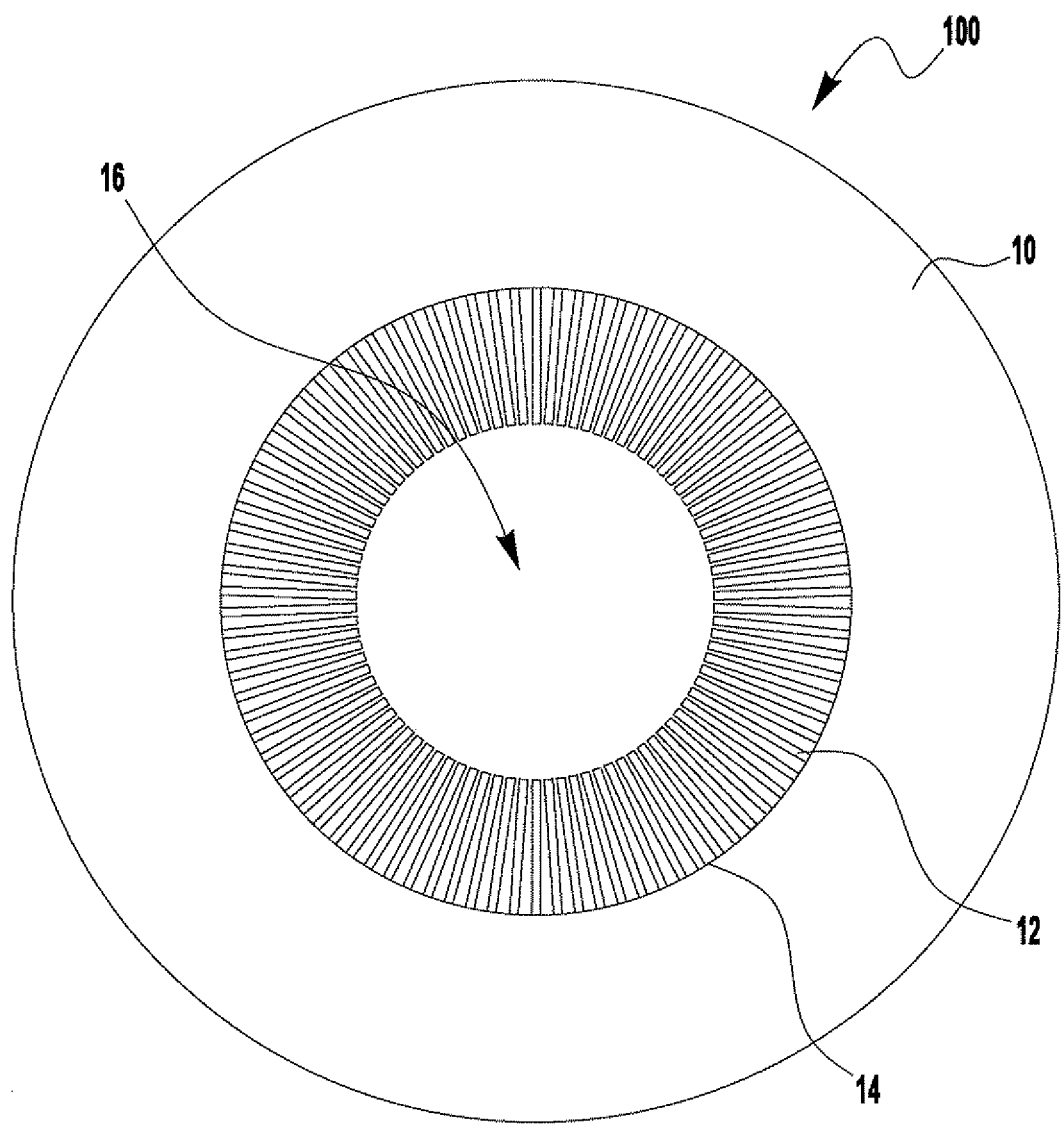
FIG. 1 is a diagrammatical representation of a wire payoff ring according to an embodiment of the present invention.
Figure 2:
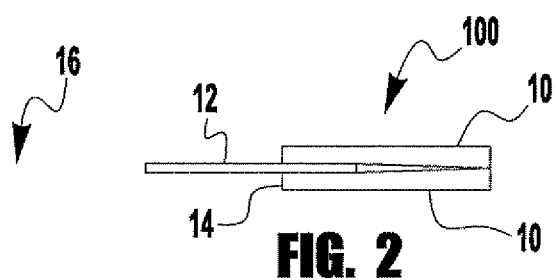
FIG. 2 is a diagrammatical representation of a cross-section of the ring shown in FIG. 1.

FIGS. 1 and 2 depict a payoff brush 100 according to an embodiment of the present invention. FIG. 1 depicts a top down view of the brush 100 whereas FIG. 2 depicts a cross-sectional view of a portion of the brush 100.

In this embodiment, the brush 100 is made up of two ring disks 10 which sandwich the brush bristles 12, which are placed around the inner periphery 14 of the brush 100. In the embodiment shown, the ring disks 10 are made of a cardboard material. However, it is contemplated that other embodiments of the present invention are made of different materials, including but not limited to plastic, metal, etc. The disks 10 are secured to each other by any known means, including but not limited to adhesion, glue, sewing, fasteners, etc., and the bristles 12 are secured between the disks 10, by methods such as gluing, sewing, etc. It is also contemplated that the bristles 12 be molded integrally with the disks 10. For example, the disks 10 can be made of molded plastic, where the bristles 12 are molded within the disks 10 during manufacture. The present invention is not limited to the structure shown in FIGS. 1 and 2 where two rings 10 are employed. In another embodiment of the present invention, the ring structure is made of a single ring structure having the bristles 12 extend similarly.

Moreover, the present invention is not limited to having the bristles 12 extend from the midpoint (in the thickness direction) of the ring structure. It is contemplated that the bristles 12 can extend from the upper and/or lower surface of the ring structure (made by rings 10), or any other point in between.

The use of the bristles 12 improves wire straightness in the wire payoff operation by improving the wire placement while the wire is paid out. However, the bristles 12 are made of a material which is flexible enough to minimize the resistance created during payoff. In an embodiment of the present invention, the bristles 12 are made of nylon, but in other embodiments can be made of any comparable materials. Further, in an embodiment of the invention, the bristles 12 have a diameter of 0.006 inch. In a further embodiment of the present invention, the bristles have a diameter in the range of 0.004 to 0.02 inches. Typically, thicker bristles are employed in brush assemblies which are used with stronger wire materials. It is well known that welding wire can be made from many different types of materials, some stronger than others. In the present invention, the diameter of the bristles chosen can be based on the wire strength. For example, thicker bristles will be employed with steel wire, while thinner bristles will be used with aluminum wire. Of course it is understood that, the present invention is not limited to the diameters discussed above, as the diameter is to be chosen to ensure proper operation of the present invention, where the bristles 12 are strong enough to ensure that the wire payoff operation is smooth and that no wire binding or snagging occurs, but that the payoff feed force remains minimized.

In a further embodiment of the present invention, bristles of different diameters are used in the bristle layer. The use of varying bristles diameters further alloys the present invention to provide smooth wire payout.

The length of the bristles 12 extend beyond the inner periphery 14 of the rings 10 by a length which sufficiently maintains the controlled payoff of a wire during the wire payoff operation. For example, in an embodiment of the invention, the outer diameter of the rings 10 are approximately 595 mm, the inner diameter is approximately 390 mm, and the length of the bristles 12 extend from the inner periphery 14 by 90 mm, so that the diameter of the central opening 16 between the bristles 12 is 210 mm.

In an embodiment of the present invention, the diameter of the opening 16 is less than or equal to the inner diameter of the wire coil from which the wire to be paid out is drawn. This ensures that the bristles 12 make contact with wire during payoff during all or most of the payoff. If the opening 16 of the bristles 12 is significantly larger than the inner diameter of the wire coil, as the wire is paid out from the inner most diameter of the wire coil, the wire may not make contact with the bristles 12 and thus the benefits of the present invention may not be enjoyed.

The overall length of the bristles 12, extending from the tips into the disks 10, is to be determined based on manufacturing criteria and is to be selected to ensure sufficient security of the bristles 12 within the disks 10. For example, the bristles 12 may extend 40 mm into the disks 10 to provide sufficient security.

Of course, all of the above dimensions are only intended to be exemplary, and the present invention is not limited to these specific dimensions. The dimensions to be used are to be determined based on the design requirements and parameters of the wire payoff system and the wire used.

Further, the overall thickness of the bristle 12 layer is to be determined to ensure smooth wire payoff while at the same time minimizing any resistance placed on the wire during wire payoff. In one embodiment, the thickness is about 0.25 inches. However, in another embodiment, the thickness of the layer is in the range of about 0.004 to 1 inches. As with the thickness of the bristles, the overall thickness of the bristle layer to be used is a function of the strength and stiffness of the wire in the wire coil. For example, for stronger wires (such as steel) the bristle layer will be thicker than for the weaker wire types (such as aluminum).

Figure 3:
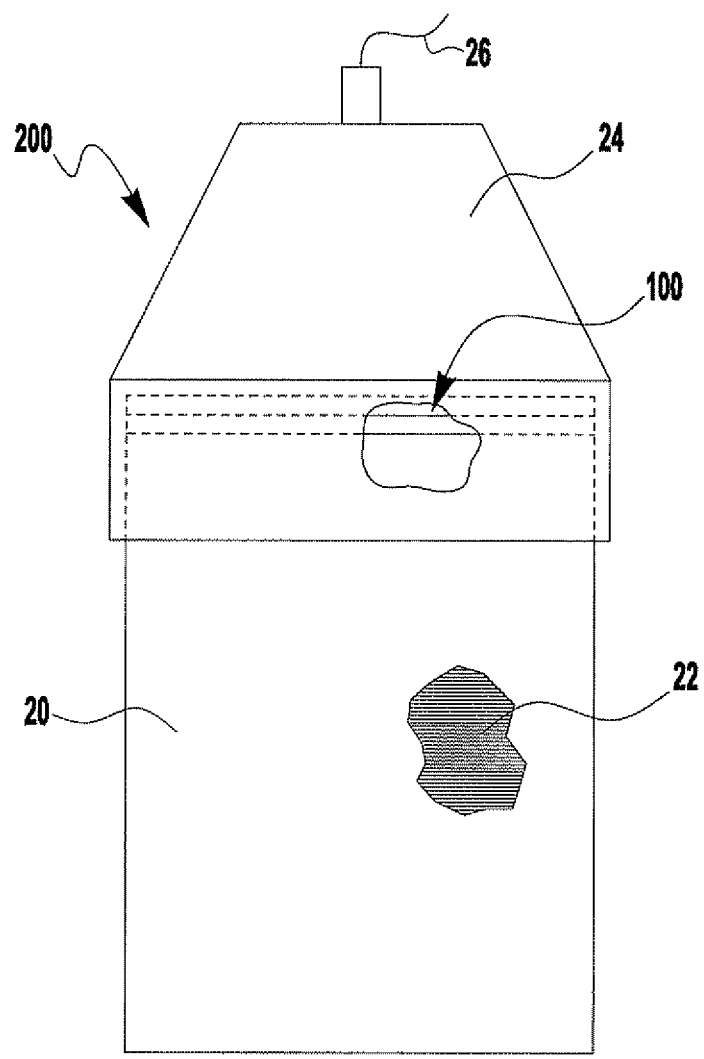
FIG. 3 is a diagrammatical representation of a wire coil container according to an embodiment of the present invention, employing a wire payoff ring according to the present invention.

FIG. 3 shows a wire coil container 200 according to the present invention which incorporates the payoff brush 100 shown in FIGS. 1 and 2. The container 200 contains a box structure 20, which is typically rectangular or square in cross-section, but can be other geometric shapes. Within the box structure 20 is a wire coil 22 which is coiled in a cylindrical shape such that it has an inner diameter and an outer diameter. In an embodiment of the invention, a core structure (not shown) is placed within the inner diameter of the wire core so as to maintain inner diameter stability of the wire coil.

Placed on top of the box structure 20 is a cap structure 24 through which the wire 26 is paid out to the welding (or other) operation. Between the box structure 20 and the cap structure 24 the payoff brush 100 is positioned, such that the wire 26 being paid out makes contact with the bristles 12 of the brush 100 during the payoff operation. In one embodiment, the payoff brush 100 is secured to the cap structure 24 so that the cap structure 24, with the brush 100, may be re-used on different boxes. In a further embodiment, the payoff brush 100 may be secured to the box structure 20, or may be removably positioned at a point between the top of the wire coil 26 and the opening through which the wire 26 is removed from the container 200.

Although FIGS. 1 and 2 show the outer edge of the payoff brush 100 to be circular in shape, the present invention is not limited to this embodiment. It is contemplated that, in other embodiments, the outer edge of the payoff brush 100 be shaped to match the shape of the box structure 20 or cap structure 24, to which it is inserted or secured. Moreover, the payoff brush 100 may be secured by any commonly known methods or means.

In a further embodiment, the payoff brush 100 is movable so that as the wire 26 is paid out from the wire coil 22, the payoff brush 100 moves down along with the height of the coil 22. In one embodiment, the payoff brush 100 rests on the top of the wire coil 22, while in another embodiment the payoff brush 100 is maintained a specified distance from the top of the wire coil 22 by a support structure (not shown). In either of these embodiments, the payoff brush 100 travels downward within the box, based on the top of the wire coil 22, as the wire 26 is paid out. In the embodiment where the payoff brush 100 is maintained a specified distance above the wire coil 22, the support structure may include a disk like structure which rests on the top of the wire coil 22, which has a plurality of supports which support the payoff brush 100 a predetermined distance above wire coil 22.

Figure 4:
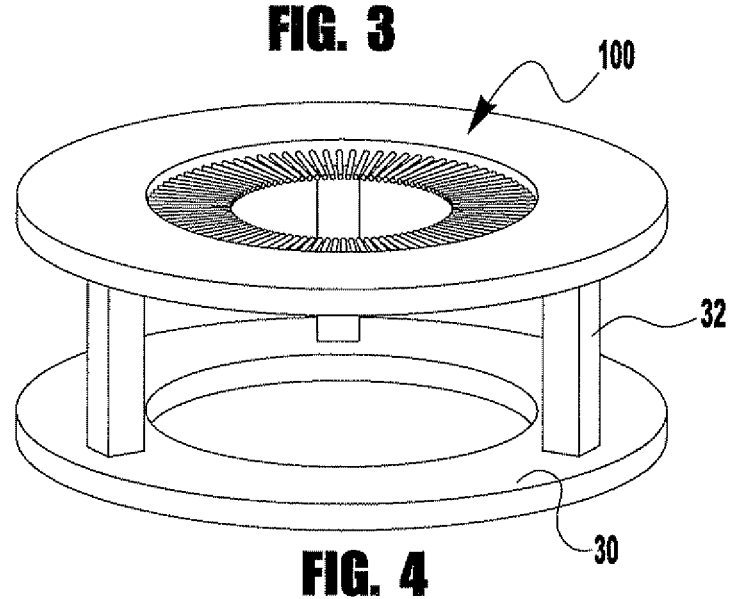
FIG. 4 is a diagrammatical representation of a wire payoff ring according to an embodiment of the present invention coupled to a support structure.

This embodiment is shown in FIG. 4, where the payoff brush 100 is shown support by a support disk 30 and a plurality of supports 32. Of course, the embodiment shown in FIG. 4 is exemplary and the present invention is not limited to the embodiment shown. Further, the size and material of the support disk 30 should be selected to minimize its interference with the wire payoff as well the risk of damaging the wire surface during payoff.

Of course, although the present invention has been discussed with respect to welding wire coils, it is contemplated that the present invention may be used in any applications where a material is coiled and is to be drawn or paid out in a smooth and efficient manner, such that the payout force needed is minimized and similar problems such as those discussed herein are desired to be avoided.

The present invention has been described with certain embodiments and applications. These can be combined and interchanged without departing from the scope of the invention as defined in the appended claims. The invention as defined in these appended claims are incorporated by reference herein as if part of the description of the novel features of the present invention.

I claim:

1. A wire coil container, comprising:
    a box structure,
    a wire coil contained within said box structure, and
    a payoff brush structure, said payoff brush structure comprises:
        a ring structure having an outer edge and an inner edge; and
        a plurality of bristles extending from said inner edge toward a center region of said payoff brush structure;
    a support structure including:
        a support disk having an outer perimeter and an innermost edge; and
        a plurality of supports disposed between said support disk and said ring structure to axially align and space said ring structure from said support disk,
    wherein said support structure is positioned on top of said wire coil to axially space said payoff brush structure above said wire coil such that wire from said wire coil will contact at least some of said bristles as said wire is removed from said box structure, wherein said wire coil has an inner diameter which is larger than a diameter of an inner region of said payoff brush structure created by said bristles.

2. The wire container of claim 1, wherein at least some of said bristles have a diameter in the range of 0.004 to 0.02 inches.

3. The wire container of claim 1, wherein said bristles are nylon.

4. The wire container of claim 1, wherein said ring structure comprises an upper ring structure and a lower ring structure and said bristles are secured between said upper and lower ring structures.

5. The wire container of claim 1, wherein said payoff brush structure is secured to said box structure.

6. The wire container of claim 1, further comprising a cap structure through which wire from said wire coil passes as said wire is removed.

7. The wire container of claim 6, wherein said payoff brush structure is secured to said cap structure.

8. The wire container of claim 1, wherein said payoff brush structure is movable within said box structure.

9. The wire container of claim 1, wherein said payoff brush structure is maintained at a predetermined distance above a top of said wire coil.

10. The wire container of claim 1, wherein said bristles are formed integrally with said ring structure.

11. The wire container of claim 1, wherein said outer shape of said ring structure is circular.

12. The wire container of claim 1, wherein said bristles form a layer having a thickness in the range of about 0.004 to about 1 inch.

13. The wire container of claim 1, wherein the ring structure is made of cardboard.

14. The wire container of claim 1, wherein at least some of the bristles have a diameter of 0.006 inches.

15. The wire container of claim 1, wherein the plurality of bristles is made up of bristles with different diameters.

16. A wire container; comprising:
a wire coil package,
a wire coil contained within said wire coil package, and
a payoff brush structure, said payoff brush structure comprises:
a ring structure having an outer edge and an inner edge; and
a plurality of bristles extending from said inner edge toward a center region of said payoff brush structure;
a support structure on top of said wire coil, said support structure including:
a support disk having an outer perimeter and an innermost edge; and
a plurality of supports disposed between said support disk and said ring structure to axially align and space said payoff structure from said wire coil,
wherein said ring structure is comprised of an upper ring structure and a lower ring structure and said bristles are secured to said ring structure between said upper and lower ring structures, and
wherein said wire coil has an inner diameter which is larger than a diameter of an inner region of said payoff brush structure created by said bristles.

17. The payoff structure of claim 16, wherein the bristles are nylon.

18. The payoff structure of claim 16, wherein the bristles have a diameter in the range of 0.004 to 0.02 inches.

19. The payoff structure of claim 16, wherein said upper and lower ring structures are secured to each other by at least one of gluing and sewing.

20. The payoff structure of claim 16, wherein the upper and lower ring structures are made of a cardboard material.

21. The payoff structure of claim 16, wherein the bristles create a center region having a circular shape.

22. The payoff structure of claim 16, wherein the plurality of bristles form a layer having a thickness in the range of about 0.004 to about 1 inch.

23. A payoff brush structure; comprising:
a ring structure having an outer edge and an inner edge; and
a plurality of bristles extending from said inner edge toward a center region of said payoff brush structure,
a support disk; and
a plurality of supports disposed between said support disk and said ring structure to axially align and space said ring structure from said support disk,
wherein said ring structure is comprised of an upper ring structure and a lower ring structure and said bristles are secured to said ring structure between said upper and lower ring structures and where said lower ring structures rests on a wire coil having an inner diameter and an outer diameter, and
wherein said wire coil has an inner diameter which is larger than a diameter of an inner region of said payoff brush structure created by said bristles.

* * * * *